United States Patent [19]
Habermann

[11] 3,885,839
[45] May 27, 1975

[54] MAGNETIC BEARING

[75] Inventor: Helmut Habermann, Vernon, France

[73] Assignee: Societe Europeenne de Propulsion, Puteaux, France

[22] Filed: Aug. 20, 1973

[21] Appl. No.: 390,009

[30] Foreign Application Priority Data
Aug. 23, 1972 France.............................. 72.30092

[52] U.S. Cl. ................................................. 308/10
[51] Int. Cl. .......................................... F16c 39/06
[58] Field of Search .......... 308/10, 36.4; 74/5, 5.46; 252/349, 360; 209/148

[56] References Cited
UNITED STATES PATENTS

| 2,856,238 | 10/1958 | Dacus ................................ 308/10 |
| 3,143,704 | 8/1964 | Wright ................................ 308/10 |
| 3,175,405 | 3/1965 | Doyle ................................. 308/10 |
| 3,393,334 | 7/1968 | Sundstrom .......................... 308/10 |
| 3,399,317 | 8/1968 | Davis .................................. 308/10 |

FOREIGN PATENTS OR APPLICATIONS

| 1,497,253 | 4/1970 | Germany ............................ 308/10 |

Primary Examiner—R. Skudy
Attorney, Agent, or Firm—Delio and Montgomery

[57] ABSTRACT

A magnetic bearing in which a magnetic body is suspended in the air gap between the rotor and the stator for movement perpendicular to the flux path across the gap. Friction restrains such movement of the magnetic body relative to the stator. The bearing is advantageous for use in an ultracentrifuge.

7 Claims, 7 Drawing Figures

MAGNETIC BEARING

The present invention relates to the damping of transverse vibrations of rotors in magnetic bearings.

A magnetic bearing comprises a mobile rotor having a magnetic material disposed at least at the ends and a fixed bearing portion in which are incorporated electromagnets the energising of which is controlled in dependence on the axial movements of the rotor, thus ensuring for the rotor a specific average position with respect to said fixed bearing portion. The above described bearings thus ensure the support of a shaft without any mechanical contact and as a result thereof they can cope with extremely high angular velocities, for example of the order of 60,000 r.p.m. or more.

At such speeds the axis of the rotor is subject to periodic oscillations about an axis perpendicular to its axis of rotation, a phenomenon known as nutation. This vibration frequency is practially proportional to the speed of rotation of the rotor about its axis and it thus becomes necessary to attenuate the nutation vibrations having regard to the velocities attained.

This attenuation forms the object of the present invention.

The essential problem is to reconcile the two apparently incompatible objectives of damping the nutation of the rotor and avoiding any contact between the rotor and the bearing.

According to the present invention there is provided a magnetic bearing comprising a stator and a rotor, together defining an air gap across which, in use of the bearing, magnetic flux flows; at least one magnetic body, in said air gap and movable relative to said stator and rotor in a direction at least approximately perpendicular to the flux path across the air gap; and means frictionally resisting movement of said body relative to said stator along said direction.

Any radial excursion of the rotor will bring with it, through resulting deformation of the flux path, a corresponding lateral displacement of the said body. By frictionally resisting lateral displacement of the magnetic body, the presence of which body will in any case reduce the effective air gap in the flux circuit, it will be possible to influence the lateral movement of the rotor by requiring a much more pronounced deformation of the flux path at the edges of the gap between the magnetic body and the rotor. This frictional restriction on displacment enables resilient damping of nutation vibtations of the rotor.

Understanding the device adopted according to the present invention will be facilitated with the aid of the following description, given merely by way of example, of several embodiments diagrammatically illustrated in the accompanying drawings in which.

Figure 1:
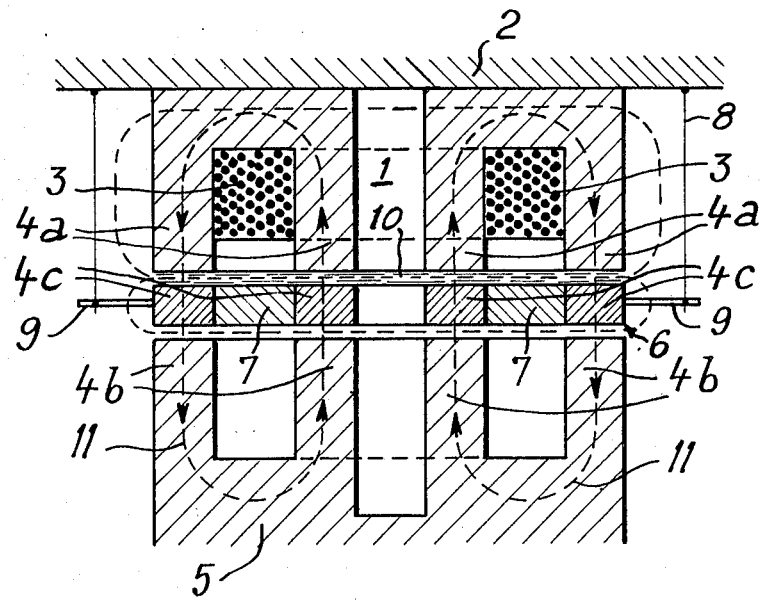
FIG. 1 is an elevational view in axial section of a damped magnetic bearing according to the invention.

FIG. 1 shows a bearing stator 1 of a known type of magnetic bearing attached to a frame 2 and comprising an electromagnet, the winding 3 of which, when energised, induces a field in a magnetic core 4a.

A rotor 5, the end 4b of which is formed of a magnetic material ensuring a magnetic flux circuit diagramatically shown at 11 in FIG. 1, is associated with this bearing.

In the path of the said flux circuit, and in the air gap contained between the bearing stator 1 and the end of the rotor 5, there is inserted a damping body 6 comprising two coaxial circular rings 4c of magnetic material located precisely in the path of the lines of flux of said circuit and separated by an annulus 7 of a non-magnetic material.

The damping body 6 is carried by a support 9 consisting, for example, of rods secured to the body 6 by means such as a force fit plugging-in or gluing. The support 9 is in turn connected to the frame 2 through the intermediary of a suspension consisting of piano wire 8 secured, for example by soldering, to the frame at one end and to the support 9 at the other end.

Finally, oil 10 maintained between the damping body 6 and the stator 1 by capillary action serves to resist frictionally movements in the damping body 6 relative to the stator 1 in a radial direction.

It should be understood that the above description is given merely by way of example and consequently is by no means limiting. The elements described could thus assume any desired form possible without departing from the scope of the accompanying claims.

By way of example, FIGS. 2, 3, 4 and 5 show various possible alternative designs of the damping body 6.

Figures 2, 4:
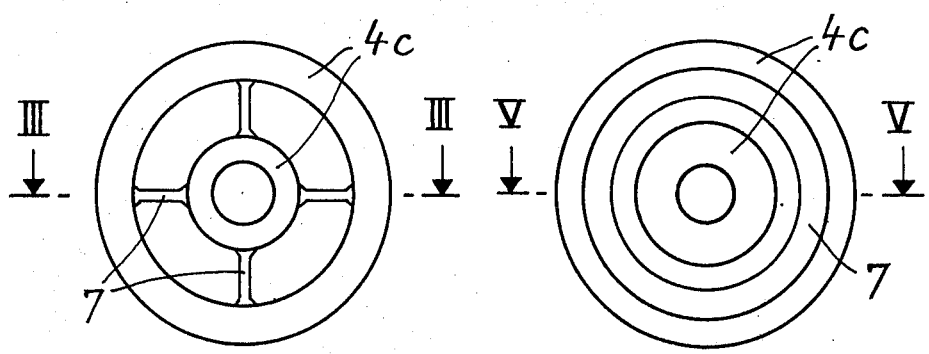
FIG. 2 is a plan view of the magnetic body inserted, between the end of the rotor and the bearing.
FIG. 4 illustrates a plan view of a further embodiment of body to be inserted between the end of the rotor and the bearing.
Figure 3:
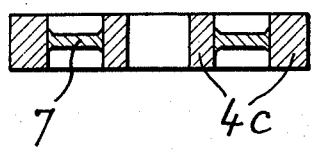
FIG. 3 represents an axial sectional view on line III—III of the body shown in FIG. 2.

FIGS. 2 and 3 show a kind of damping body 6 wherein the magnetic material 7 separating the two coaxial circular magnetic rings 4c is in the form of radial bars or spokes interconnecting the rings instead of in the form of annulus; the number of such bars is of course unimportant and can be varied as desired.

Figure 5:
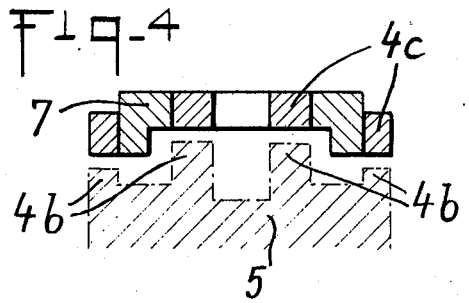
FIG. 5 represents an axial sectional view on line V—V of the body shown in FIG. 4.

In FIGS. 4 and 5 another kind of damping body 6 can be seen in which the upper and/or lower surfaces of the two magnetic rings 4c are no longer coplanar. This may have a number of advantages. For example the amplitude of radial excursions of the rotor can be limited in a flexible manner by imparting to the upper end 4b of said rotor a shape, such as that shown for example in dot-dash lines in FIG. 5, so that beyond a specific maximum amplitude of rotor radial displacement, unless the damping body 6 already accompanies the radial movement of the rotor, the rotor will abut the lower surface of the body 6. Also the damping action may be adjusted by modifying the space between the upper surface of the body 6 and the bearing 1, for example by interengaging threads between one of the rings 4c and the material 7.

Figure 6:
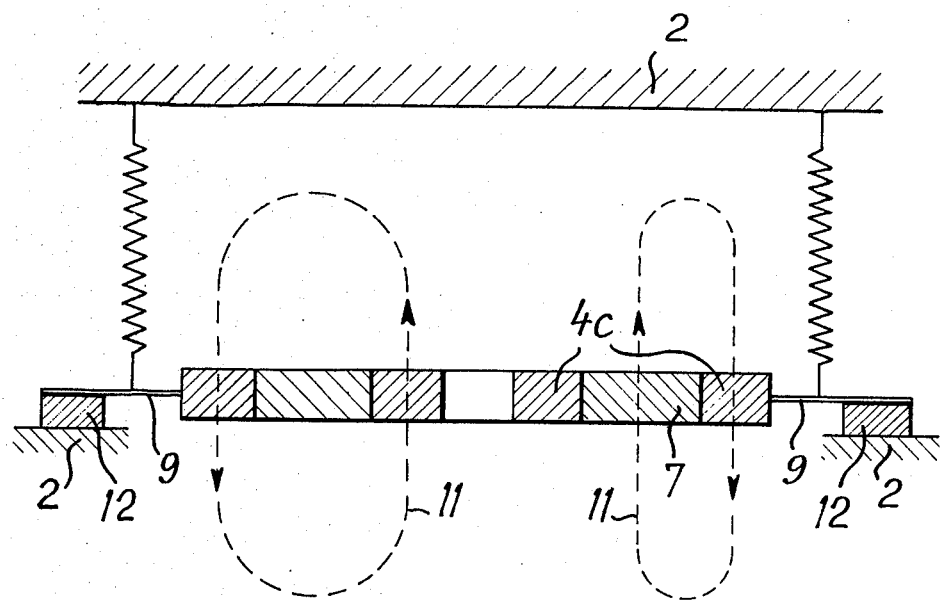
FIG. 6 shows in axial sectional view a further embodiment of a magnetic body such as that shown in FIG. 1.

FIG. 6 shows a further embodiment of the suspension and friction means of the body 6. In comparison to the embodiment of FIG. 1, this embodiment has the piano wires replaced by springs while the supports 9 are directly resting on the friction members 12, for example of rubber, which are integral with the frame 2.

Figure 7:
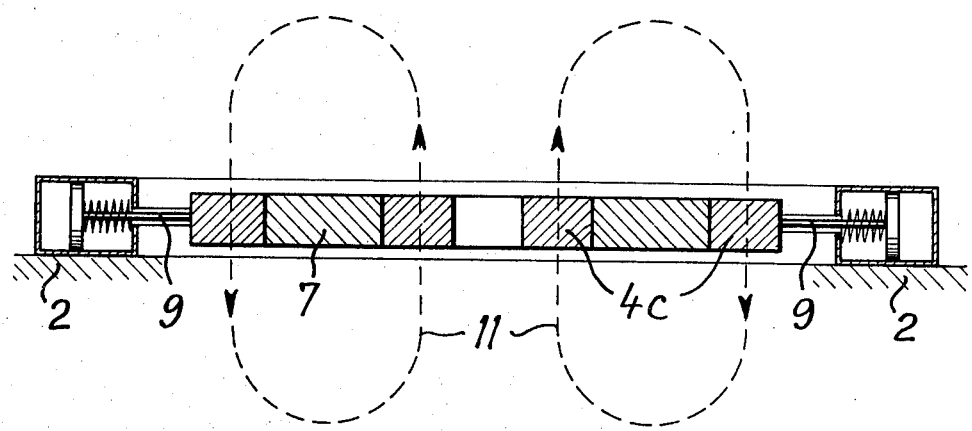
FIG. 7 shows an axial sectional view of a further embodiment of a magnetic damping body such as that shown in FIG. 1.

A further embodiment of the suspension and friction means of the body 6 can be seen in FIG. 7. In this embodiment the support rods 9 of the body 6 are connected for example by welding of their ends, to shoes immersed in a liquid contained in an annular tank integral with the frame 2, thus ensuring both the radial positioning and the damping of the body 6. Springs surrounding the supports 9 ensure an additional return effect. The bearing is advantageous for use in an ultracentrifuge.

We claim:

1. A magnetic bearing comprising stator means, a rotor, air gap means between said stator means and rotor, means for creating magnetic flux linking the rotor and stator means across said air gap means, at least one magnetic body, means mounting said body in said air gap means for movement relative to said stator means and the rotor in a radial direction at least approximately perpendicular to the flux path across the air gap means, and friction means positioned between the said body and said stator means for resisting displacement of said body along said radial direction.

2. A bearing as set forth in claim 1, wherein said magnetic body comprises a circular ring located in the flux path across said air gap means.

3. A bearing as set forth in claim 2, wherein said air gap means comprise a number of concentric annular air gaps where said number is greater than unity, and said circular ring comprises the same number of coaxial circular ring members one being disposed in each of the air gaps between the rotor and the stator means and wherein spacer means are provided between adjacent coaxial ring members.

4. A bearing as set forth in claim 1 wherein said stator means comprise a frame and a magnetic core secured to said frame, and the magnetic body mounting means comprises suspension means consisting of at least one of the group comprising thread, piano wire and springs and connected between said magnetic body and said frame.

5. A bearing as set forth in claim 1, wherein said friction means between said stator means and said magnetic body comprise a viscous medium held by capillary action between said magnetic body and the said stator means.

6. A bearing as set forth in claim 1, wherein said friction means between said stator means and the magnetic body comprise interengaging means on said stator means and said mounting means for said magnetic body.

7. A bearing as set forth in claim 6, wherein said stator means comprise a frame and a magnetic core secured to said frame and said interengaging means comprise friction members carried by said mounting means and engageable with said frame.

* * * * *